United States Patent
Nakazato

(10) Patent No.: US 9,413,903 B2
(45) Date of Patent: Aug. 9, 2016

(54) IMAGE FORMING APPARATUS HAVING AN AUTOMATIC DOCUMENT FEEDER WITH A SWITCHBACK MECHANISM SUITABLE FOR READING OF FRONT AND BACK OF A SINGLE-SIDED DOCUMENT

(71) Applicant: KYOCERA Document Solutions Inc., Osaka (JP)

(72) Inventor: Yosuke Nakazato, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/811,759

(22) Filed: Jul. 28, 2015

(65) Prior Publication Data
US 2016/0028901 A1    Jan. 28, 2016

(30) Foreign Application Priority Data

Jul. 28, 2014   (JP) .................. 2014-152710

(51) Int. Cl.
*H04N 1/40* (2006.01)
*H04N 1/00* (2006.01)
*G06K 9/00* (2006.01)

(52) U.S. Cl.
CPC ........ *H04N 1/00005* (2013.01); *G06K 9/00442* (2013.01); *H04N 1/00082* (2013.01); *H04N 1/00641* (2013.01)

(58) Field of Classification Search
None
See application file for complete search history.

(56) References Cited

U.S. PATENT DOCUMENTS 5,347,351 A * 9/1994 Morita .................. G03G 15/23
                                                      399/374
8,330,986 B2 * 12/2012 Okumura .......... H04N 1/00572
                                                      358/1.16

FOREIGN PATENT DOCUMENTS

JP          2007-049474 A       2/2007

* cited by examiner

*Primary Examiner* — Steven Kau
(74) *Attorney, Agent, or Firm* — Hawaii Patent Services; Nathaniel K. Fedde; Kenton N. Fedde

(57) ABSTRACT

Provided is an image forming apparatus that eliminates the necessity for resetting a single-sided document even if a set error of the single-sided document is occurred. The automatic document feeder includes a switchback mechanism that inverts the front and back of the single-sided document to switch a surface of the single-sided document. The automatic document feeder control circuit controls to activate the switchback mechanism. When a blank paper is detected from the image data before inversion, the automatic document feeder control circuit controls to continue the activation of the switchback mechanism for a second document and succeeding documents of the single-sided document. Otherwise, when a blank paper is not detected from the image data before inversion, the automatic document feeder control circuit controls to stop the activation of the switchback mechanism for the second document and the succeeding documents of the single-sided document.

4 Claims, 5 Drawing Sheets

A reading system for a document by a typical image forming apparatus, such as MFP (Multifunction Peripherals) and a printer, includes a sheet feeding system that reads a document conveyed at a regular speed by a read head including a fixedly disposed light source and a line sensor.

IMAGE FORMING APPARATUS HAVING AN AUTOMATIC DOCUMENT FEEDER WITH A SWITCHBACK MECHANISM SUITABLE FOR READING OF FRONT AND BACK OF A SINGLE-SIDED DOCUMENT

INCORPORATION BY REFERENCE

This application is based on and claims the benefit of priority from Japanese Patent Application No. 2014-152710 filed on Jul. 28, 2014, the entire contents of which are hereby incorporated by reference.

BACKGROUND

The present disclosure relates to an image forming apparatus suitable for reading of a document.

A reading system for a document by a typical image forming apparatus, such as MFP (Multifunction Peripherals) and a printer, includes a sheet feeding system that reads a document conveyed at a regular speed by a read head including a fixedly disposed light source and a line sensor.

Since the sheet feeding system is unable to check a conveying state of the document, it is not easy to determine a relationship between a direction of the document and a direction of the read head. For this reason, especially, in the event that a direction of the document, on only one side of which printing is applied (hereinafter referred to as a single-sided document), is inadvertently set by mistake (hereinafter referred appropriately to as a set error), it will occur a situation where a back side of a surface a user wants to be read (surface on which printing is applied) is read. Incidentally, if the back side of the surface the user wants to be read (surface on which printing is applied) is a blank paper, it follows that the surface of the blank paper is read.

For the sheet feeding system, the system allows an automatic feeding of a plurality of documents by an ADF (Automatic Document Feeder). If once a direction of all the single-sided documents is inadvertently set by mistake, a surface of the blank paper of all the documents is read.

Incidentally, as for copy processing, when image data of the document read by the read head is printed on a copier paper, and output after the image data is subjected to image processing, a user can become aware of a set error of the document by checking that printing is not applied on the copier paper. In contrast, when image data of the document read by the read head is transmitted or distributed after the image data is subjected to the image processing, as in the case of facsimile transmission processing and scanner distribution processing, it not seldom happens that a user cannot become aware of a set error of the document until a recipient points out the set error.

Meanwhile, other typical image forming apparatus determines whether a document is a blank paper or not from the image data generated by reading an image of the top page of the document, and if a blank paper is detected, displays information on the detection of the blank paper on a liquid crystal touch panel.

SUMMARY

An image forming apparatus comprising an automatic document feeder that automatically feeds a single-sided document; an automatic feeder control circuit that controls document feeding of the automatic document feeder; a reading circuit that reads the single-sided document automatically fed by the automatic document feeder; an image processing circuit that converts an image signal read by the reading circuit into image data; and a blank paper detecting circuit that detects whether the single-sided document is a blank paper or not from the image data converted by the image processing circuit, wherein the automatic document feeder includes a switchback mechanism that inverts the front and back of the single-sided document to switch a surface of the single-sided document opposing the reading circuit, and the automatic document feeder control circuit controls to activate the switchback mechanism for a first document of the single-sided document to read a front surface and a back surface of the single-sided document by the reading circuit, to continue the activation of the switchback mechanism for a second document and succeeding documents of the single-sided document when a blank paper is detected from the image data before inversion by the blank paper detecting circuit, and to stop the activation of the switchback mechanism for the second document and the succeeding documents of the single-sided document when a blank paper is not detected from the image data before inversion by the blank sheet detecting circuit.

DETAILED DESCRIPTION

Hereinafter, an embodiment of an image forming apparatus according to the present disclosure will be described with reference to FIG. 1 to FIG. 5. In this context, it should be noted that an example of the image forming apparatus in the following description shall be a MFP (Multifunction Peripheral) that is a multifunction printer. Further, an ADF (Auto Document Feeder) shall be mounted on the MFP to be described later.

Figure 1:
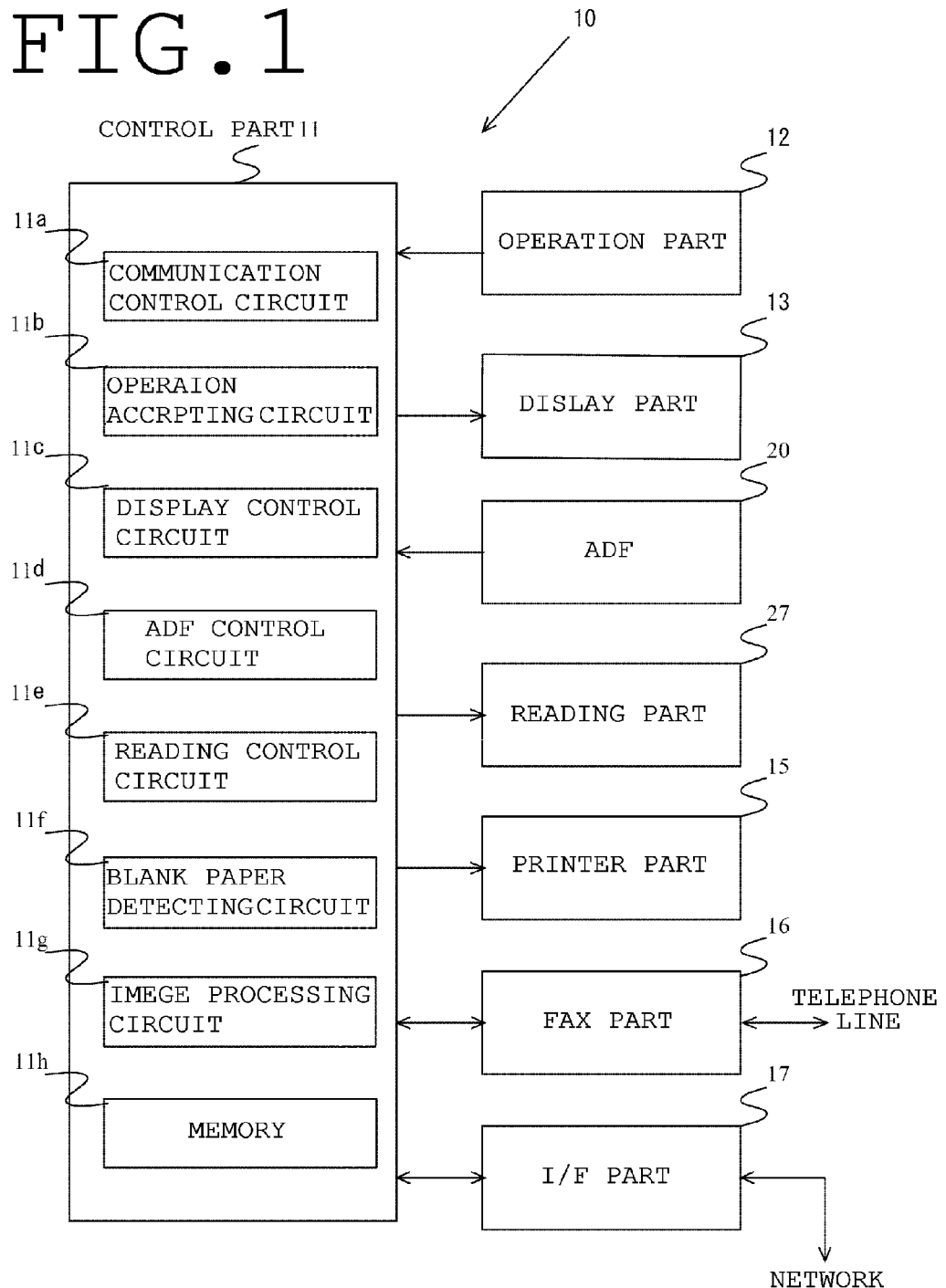
FIG. 1 is a block diagram of an embodiment of an image forming apparatus of according to the present disclosure.

As shown in FIG. 1, the MFP 10 includes a control part 11, an operation part 12, a display part 13, an ADF 20, a reading circuit 27, a printer part 15, a FAX part 16, and an I/F (interface) 17. The control part 11 is a processor that controls the overall operation of the MFP 10 based on programs stored in a ROM (Read Only Memory), and includes a communication control circuit 11a, an operation accepting circuit 11b, a display control circuit 11c, an ADF control circuit 11d, a reading control circuit 11e, a blank paper detecting circuit 11f, an image processing circuit 11g, and a memory 11h.

The communication control circuit 11a receives a user file or the like, for example, from a file server via the I/F 17. The received user file is passed to the image processing circuit 11g. Further, the communication control circuit 11a receives a printing request or the like from a user terminal connected to the I/F 17.

The operation accepting circuit 11b accepts an operation such as settings associated with copy processing, facsimile transmission processing, and scanner distribution processing by the operation part 12. The display control circuit 11c controls information for displaying on the operation part 12.

Once either of double-sided reading or single-sided reading is set by an operation of the control part 12, the ADF control circuit 11d controls an operation of the ADF 20 to be described later depending on the respective settings. In this connection, the details of how to control the operation of the ADF 20 by the ADF control circuit 11d will follow later.

The reading control circuit 11e controls the reading of a document 30 to be described later by the reading circuit 27. In this connection, the details of how to control the reading of the document 30 by the reading control circuit 11e will follow later. The blank paper detecting circuit 11f detects whether a blank paper is detected or not from image data of the document 30 that is described later and is read by the reading circuit 27. The image processing circuit 11g applies, for example, in the copy processing, image processing such as rasterization or the like to the image data of the document 30 that is described later and is read by the reading circuit 27. In the facsimile transmission processing and the scanner distribution processing, image processing as corresponding to each transmission and distribution is executed. The memory 11h stores image data or the like of the document 30 that is described later and is read by the reading circuit 27.

The operation part 12 is a circuit for accepting an input from a user interface or a button to be operated when the copy processing, the facsimile transmission processing, and the scanner distribution processing or the like are executed, and is configured of a touch panel, for example. In the copy processing, the facsimile transmission processing, and the scanner distribution processing, either of double-side reading or single-side reading can be set. Hereinafter, setting of the double-side reading shall be referred to as a double-side reading setting and setting of the single-side reading shall be referred to as a single-side reading setting. The display part 13 displays various information such as a button and setting items associated with settings of the copy processing, the facsimile transmission processing, and the scanner distribution processing.

The ADF 20 performs automatic feeding of the document to be described later, and the details thereof will follow later. The reading circuit 27 reads the automatically fed document 30 to be described later. The reading circuit 27 inputs image data of the document 30 that is described later and is read by the image sensor to the control part 11. In other words, the reading circuit 27 converts an image signal of the document 30 to be described later output from the image sensor into digital image data, and sequentially inputs the image data to the control part 11. The detail of the reading circuit 27 will follow later.

The printer part 15 prints an image on a copier paper based on the image data output from the control part 11. In other words, the printer part 15 forms an electrostatic latent image on a photosensitive drum by a laser beam modulated based on the image processed image data output from the control part 11. Then, a toner image is formed from the electrostatic latent image developed by supply of toner, and the toner image is transferred on a copier paper.

The FAX part 16 transmits the image data output from the control part 11 to a facsimile of a recipient via a telephone line, and receives the image data from the facsimile of the recipient to input the image data to the control part 11. In other words, the FAX part 16 compresses and modulates the image data output from the control part 11 while controlling connection with the telephone line via a NCU (Network Control Unit), and transmits the image data to the facsimile of the recipient.

The FAX part 16 demodulates and decompresses the image data from the facsimile of the recipient while keeping the connection with the telephone line via the NCU, and inputs the image data to the control part 11. The I/F part 17 allows transmission and reception of data between the file server and a client terminal.

For a job executing a copy function, image data is input from the reading circuit 27 to the memory 11h, and the image data is output from the memory 11h to the printer part 15. For a job executing a print function, image data rasterized by the image processing circuit 11g is output to the printer part 15. For a job executing a scanner function, image data is input from the reading circuit 27 to the memory 11h, and the image data is output from the memory 11h to the I/F 17.

For a job executing a facsimile transmitting function, image data is input from the reading circuit 27 (or the I/F 17) to the memory 11h, and the image data is output from the memory 11h to the FAX part 16. For a job executing a facsimile receiving function, image data is input from the FAX part 16 to the memory 11h, and the image data is output from the memory 11h to the printer part 15.

(Configuration of ADF 20)

Figure 2:
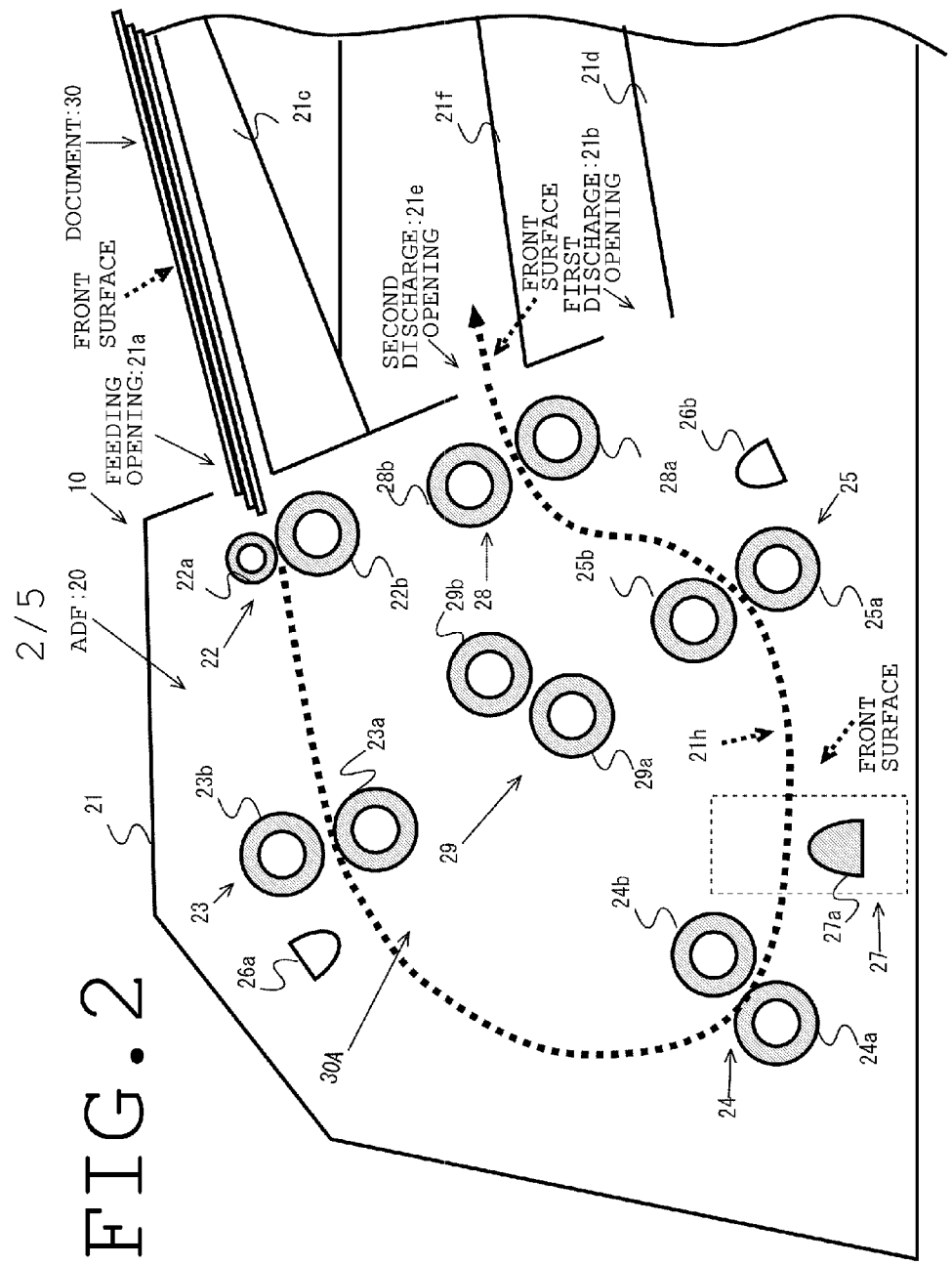
FIG. 2 shows a configuration of an ADF mounted on the image forming apparatus shown in FIG. 1.
Figure 3:
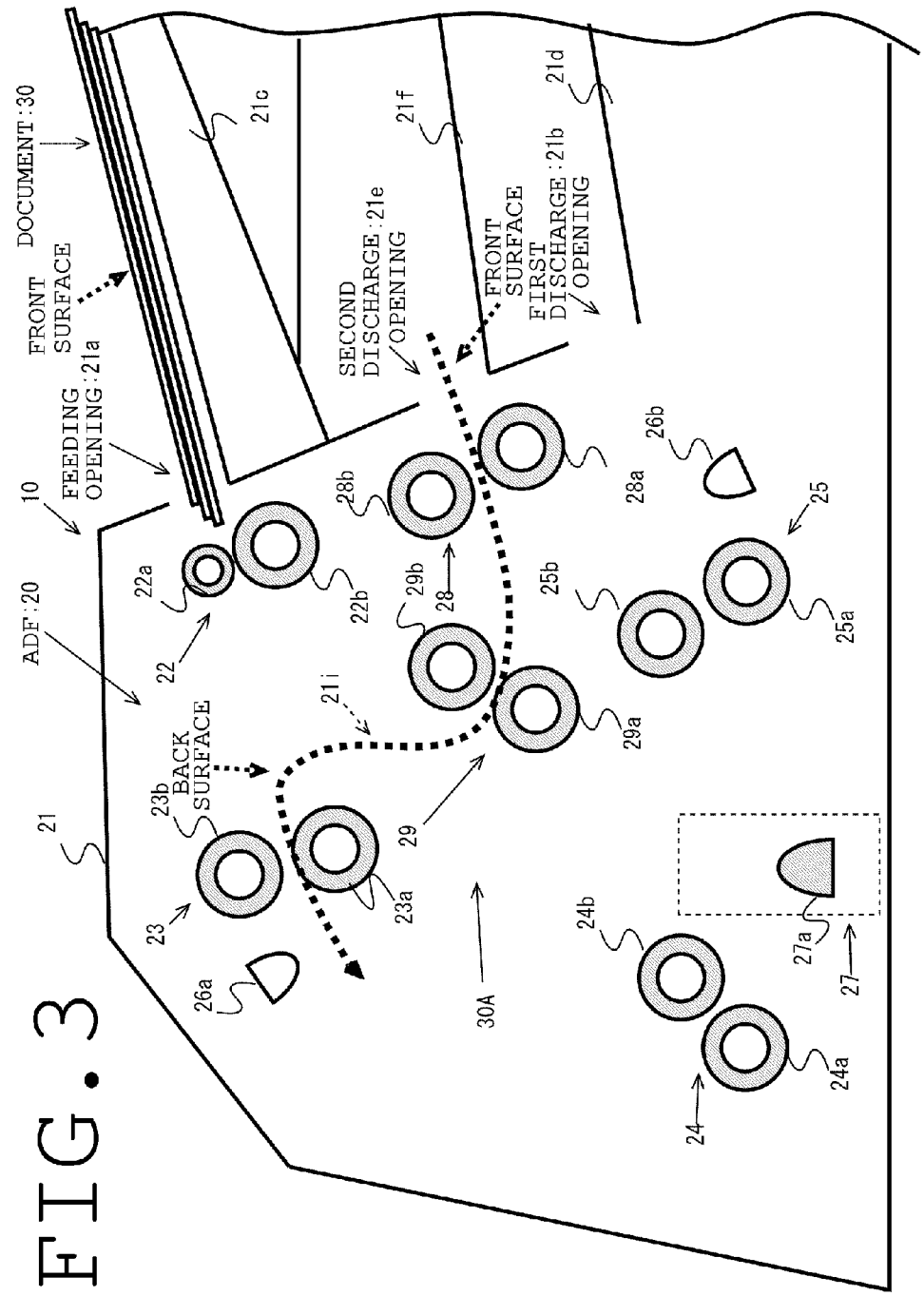
FIG. 3 is a drawing for explaining a switchback mechanism of the ADF shown in FIG. 2.
Figure 4:
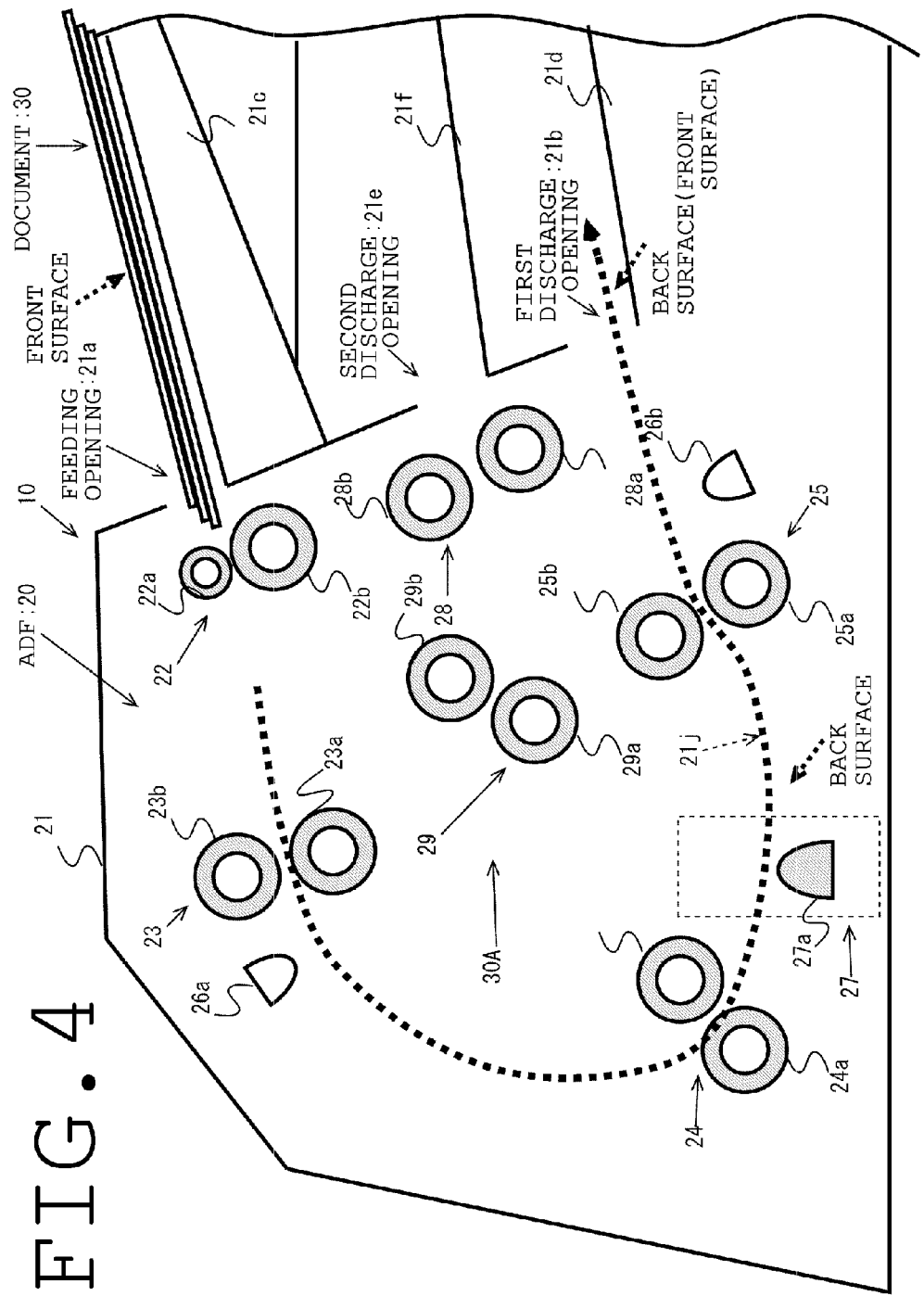
FIG. 4 is a drawing for explaining the switchback mechanism of the ADF shown in FIG. 2.

Then, an example of the ADF 20 mounted on the MFP 10 will be described with reference to FIG. 2 to FIG. 4. The reading circuit 27 of the ADF 20 shown in FIG. 2 to FIG. 4 is provided with a reading sensor 27a. Further, the ADF 20 shown in FIG. 2 to FIG. 4 is provided with a switchback mechanism 30A to be described later. The switchback mechanism 30A enables reading of a front surface and a back surface of the document 30 by the reading sensor 27a. For example, in the copy processing, the facsimile transmission processing, and the scanner distribution processing, it is allowed to set to either of a single-side reading setting or a double-side reading setting. A plurality of documents 30 set on a document holder 21c to be described later are fed in order from the top.

As shown in FIG. 2, the ADF 20 has a plurality of conveyance rollers 22 to 25, 28, and 29 arranged inside of a housing 21. The housing 21 is provided with a paper feeding opening 21a, a first discharge opening 21b, the document holder 21c, and a discharge tray 21d, a second discharge opening 21e, and a discharge tray 21f. The plurality of documents 30 can be set on the document holder 21c. Herein, an upper side of the document 30 set on the document holder 21c is assumed to be a front surface, and a under side thereof is assumed to be a back surface. The documents 30 set on the document holder 21c are separated one by one by a separation mechanism. As a separation mechanism, a sucker method and a friction method may be adopted.

The conveyance rollers 22 to 25, and 28 are arranged along a conveyance path 21h of the document 30 shown in a dotted line. As shown in FIG. 3, the conveyance roller 29 is arranged along a conveyance path 21i of the document 30 shown in a dotted line. The document 30 conveyed along the conveyance path 21i is conveyed along a conveyance path 21j shown in a dotted line in FIG. 4. Herein, the switchback mechanism 30A is made up of the conveyance rollers 28, 29, and 23. The arrangement of the conveyance rollers 22 to 25, 28, and 29 is different depending on the model and hence may be changed arbitrary. Similarly, the switchback mechanism 30A made up of the conveyance rollers 28, 29, and 23 is also different depending on the model and hence may be changed arbitrary.

The conveyance roller 22 is arranged in the vicinity of the paper feeding opening 21a of the housing 21, and is provided with a driving roller 22a and a driven roller 22b. The driving roller 22a and the driven roller 22b of the conveyance roller 22 are pressed against a front surface and a back surface of the document 30 separated by the above-mentioned separation mechanism, and one uppermost paper of the document 30 set on the document holder 21c is pulled into the housing 21 while rotating the document 30. Then, the conveyance roller 22 feeds the document 30 set on the document holder 21c to the reading circuit 27 side to be described later.

The conveyance roller 23 is positioned at the downstream side of the conveyance roller 22 on the conveyance paths 21h, 21j, and feeds the document 30 fed through the conveyance roller 22 to a conveyance roller 24 side at the downstream side along the conveyance paths 21h, 21j. The conveyance roller 23 is provided with a driving roller 23a and a driven roller 23b. The driving roller 23a and the driven roller 23b are pressed against a front surface and a back surface of the document 30, and feed the document 30 while rotating the document 30.

A detecting sensor 26a is arranged in the vicinity of the conveyance roller 23. The detecting sensor 26a detects the document 30 fed from the conveyance roller 23. If the document 30 is not detected by the detecting sensor 26a, it is determined to be a pulling-in error (paper jam) of the document 30 from the document holder 21c, and an error notification is displayed on the above-mentioned display part 13.

The conveyance roller 24 is positioned at the downstream side of the conveyance roller 23 on the conveyance paths 21h, 21j, and feeds the document 30 fed through the conveyance roller 23 to the reading circuit 27 side at the downstream side along the conveyance paths 21h, 21j. The conveyance roller 24 is provided with a driving roller 24a and a driven roller 24b. The driving roller 24a and the driven roller 24b are pressed against a front surface and a back surface of the document 30, and feed the document 30 while rotating the document 30.

The reading circuit 27 is positioned at the downstream side of the conveyance roller 24 on the conveyance paths 21h, 21j, and reads the document 30 fed through the conveyance roller 24. In other words, the reading circuit 27 is provided with a reading sensor 27a. The reading sensor 27a is positioned at the downstream side of the conveyance paths 21h, 21j, and reads a front surface side of the document 30. Meanwhile, aback surface of the document 30 is inverted by the above-mentioned switchback mechanism 30A by feeding the document 30 along the conveyance path 21j shown in FIG. 4, and read by the reading sensor 27a.

In this context, the front surface side of the document 30 is a surface side on which printing is applied, and where the document 30 set on the document holder 21c is facing upward. When the double-side reading setting is specified, a surface side of the document 30 conveyed at a regular speed is read by the reading sensor 27a, and then inverted by the switchback mechanism 30A. Thereby, a back surface side of the document 30 is read by the reading sensor 27a. Otherwise, when the single-side reading setting is specified, a front surface and a back surface of a first document are read by the reading sensor 27a, and only a surface side on which printing is applied is read for a second document and succeeding documents. The details thereof will follow later. The arrangement of the reading circuit 27 is different depending on the model and hence may be changed arbitrary.

The conveyance roller 25 is positioned at the downstream side of the reading circuit 27 on the conveyance paths 21h, 21j, and discharges the document 30 fed through the conveyance roller 24 from the first discharge opening 21b of the housing 21 to the discharge tray 21d side along the conveyance path 21j. The conveyance roller 25 is provided with a driving roller 25a and a driven roller 25b. The driving roller 25a and the driven roller 25b are pressed against a front surface and a back surface of the document 30, and feed the document 30 while rotating the document 30. In the exemplary embodiment, the document 30 read by the reading circuit 27 is discharged in a face down manner. Alternatively, if it is desired to discharge the document 30 in a face up manner, it has only to invert the document 30 by the switchback mechanism 30A and discharge the document 30 from the second discharge opening 21e to the discharge tray 21d side through the conveyance roller 28 along the conveyance path 21h.

A detecting sensor 26b is arranged in the vicinity of the conveyance roller 25. The detecting sensor 26b detects the document 30 fed through the conveyance roller 25. If the document 30 is not detected by the detecting sensor 26b, it is determined to be a conveyance error (paper jam) on the reading circuit 27, and an error notification is displayed on the above-mentioned display part 13.

As shown in FIG. 3, the conveyance roller 29 is positioned at the downstream side of the conveyance roller 28 on the conveyance path 21i, and feeds the document 30 fed through the conveyance roller 28 to the conveyance roller 23 side along the conveyance path 21i. The conveyance roller 29 is provided with a driving roller 29a and a driven roller 29b. The driving roller 29a and the driven roller 29b are pressed against a front surface and a back surface of the document 30, and feed the document 30 while rotating the document 30.

As shown in FIG. 4, the document 30 fed to the conveyance roller 23 side is fed to the reading circuit 27 side along the conveyance path 21j, and read by the reading sensor 27a. A surface of the document 30 to be read here is a back surface side inverted by the switchback mechanism 30A. Then, the document 30 read by the reading sensor 27a is discharged from the first discharge opening 21b to the discharge tray 21d side through the conveyance roller 25.

(Reading Process of Document 30)

Figure 5:
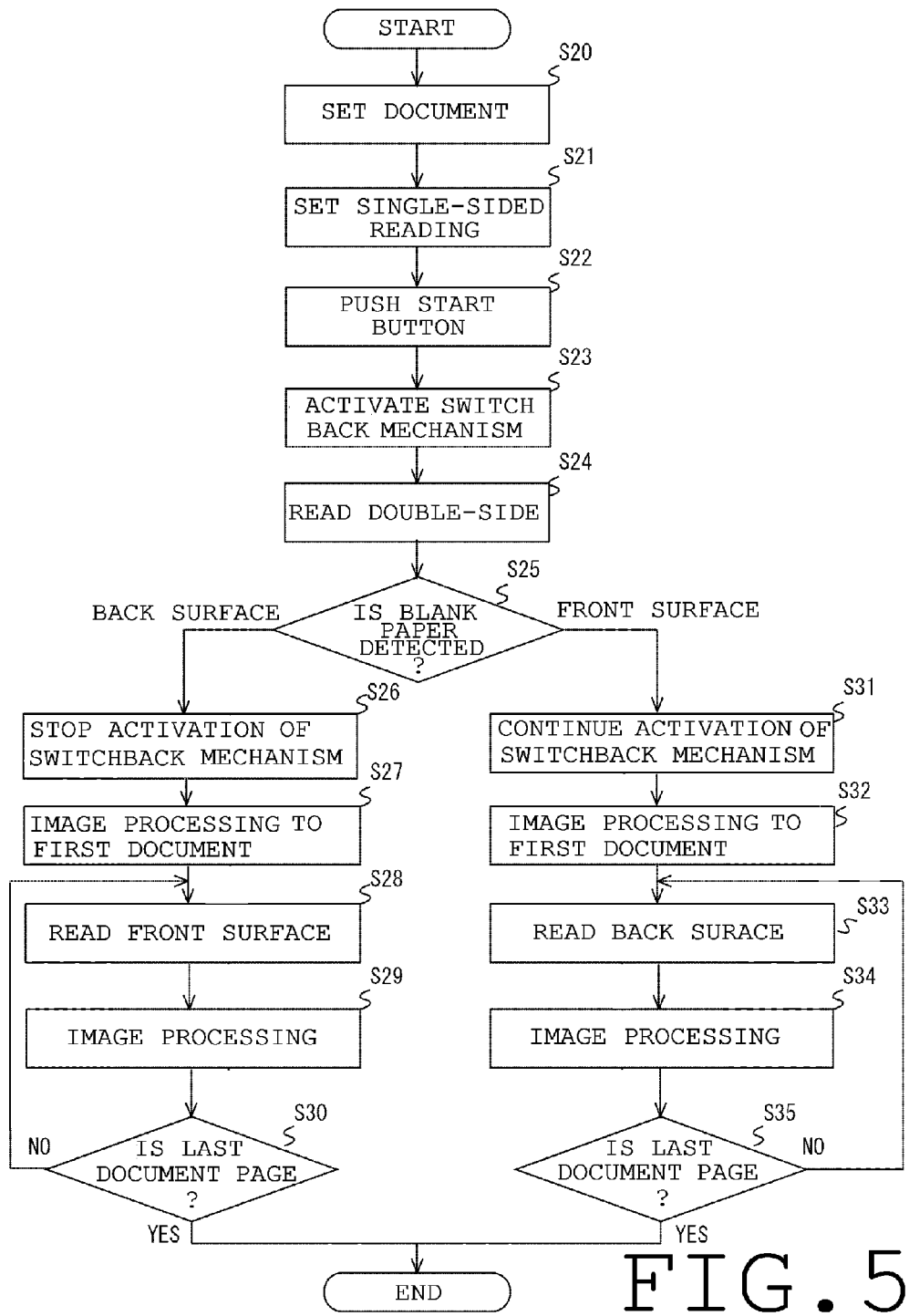
FIG. 5 shows steps of reading process of a document in the image forming apparatus on which the ADF is mounted.

Reading process of the document 30 will be described with reference to FIG. 5. In this context, the document 30 to be described later is assumed to be a single-sided document only on front surface side of which printing is applied, for example. Further, processing to be described later is assumed to be copy processing. Moreover, a reading setting in the copy processing shall be a single-side reading setting.

First, the ADF control circuit 11d detects that the document 30 is set on the document holder 21c (step S20). Then, the operation accepting circuit 11b accepts the single-side reading setting based on an operation of the operation part 12 (step S21), and accepts depression of a start button (step S22). Thereby, the ADF control circuit 11d activates the ADF 20. At this moment, the ADF control circuit 11d activates the switchback mechanism 30A (step S23).

When the ADF 20 is activated, the document 30 separated by the separation mechanism is pulled into the inside of the housing 21 by the conveyance roller 22. The document 30 pulled into by the conveyance roller 22 is fed at a regular speed to the reading circuit 27 side along the conveyance path 21h through the conveyance rollers 23, 24. When the end of the document 30 reaches the reading circuit 27, the reading circuit 27 reads a surface of the opposing document 30.

The document 30 read by the reading circuit 27 is once pushed out from the second discharge opening 21e to the discharge tray 21f side through the conveyance roller 28 of the switchback mechanism 30A. Thereafter, as shown in FIG. 3, the document 30 is fed to the conveyance roller 29 side and the conveyance roller 23 side of the switchback mechanism 30A along the conveyance path 21i. Herein, when the document 30 is passed from the conveyance roller 29 to the conveyance roller 23, the front and back of the document 30 is inverted.

As shown in FIG. 4, the document 30 whose front and back is inverted by the conveyance roller 23 is fed at a regular speed to the reading circuit 27 side along the conveyance path 21*j* through the conveyance rollers 23, 24. When the end of the document 30 reaches the reading circuit 27, the reading circuit 27 reads a back surface side of the document 30. The reading of the front surface and the back surface of the document 30 by the reading circuit 27 becomes able to read the both surfaces of the document 30 (step S24).

Herein, the image processing circuit 11*g* converts an image signal read by the reading sensor 27*a* of the reading circuit 27 into image data. Then, the blank paper detecting circuit 11*f* detects a blank paper (step S25).

When the blank paper detected by the blank paper detecting circuit 11*f* is a back surface, the ADF control circuit 11*d* controls to stop the activation of the switchback mechanism 30A (step S26). This is because it eliminates the necessity for inverting a second document and succeeding documents of the document 30 by the switchback mechanism 30A, as the document 30 is set on the document holder 21*c*, with a front surface side thereof on which printing is applied facing upward.

Then, applying the image processing to a first document 30 by the image processing circuit 11*g* (step S27) allows the document 30 to print on a copier paper. Herein, the first document 30 read by the reading circuit 27 is discharged from the discharge opening 21*b* of the housing 21 to the discharge tray 21*d* side along the conveyance path 21*j* through the conveyance roller 25.

Subsequently, when a second document 30 is fed to the reading circuit 27 side, the reading circuit 27 reads the document 30. In this instance, since a surface of the first document 30 on which printing is applied is a front surface side, the reading sensor 27*a* reads the front surface side of the document 30 (step S28). Then, applying the image processing to the second document 30 by the image processing circuit 11*g* (step S29) allows the document 30 to print on a copier paper. The second document 30 read by the reading circuit 27 is discharged from the discharge opening 21*b* of the housing 21 to the discharge tray 21*d* side.

Thereafter, reading of a front surface side of a third document and succeeding documents of the document 30 by the reading sensor 27*a* (step S28), and image processing to the document 30 by the image processing circuit 11*g* (step S29) are repeated (step S30: NO), as with the second document. When copy processing to the last page of the document based on the reading by the reading circuit 27 is completed (step S30: YES), the processing is terminated.

Meanwhile, when in step S25, a blank paper detected by the blank paper detecting circuit 11*f* is a front surface, the ADF control circuit 11*d* controls to continue the activation of the switchback mechanism 30A (step S31). This is because it needs to invert the second document and succeeding documents of the document 30 by the switchback mechanism 30A, as the document 30 is set on the document holder 21*c*, with a surface side thereof on which printing is applied facing downward.

Then, applying the image processing to the first document 30 by the image processing circuit 11*g* (step S32) allows the document 30 to print on a copier paper. Herein, the first document 30 read by the reading circuit 27 is discharged from the discharge opening 21*b* of the housing 21 to the discharge tray 21*d* side along the conveyance path 21*g* through the conveyance roller 25.

Subsequently, the second document 30 is fed to the reading circuit 27 side. However, since printing is not applied on a surface of the document 30 opposing the reading sensor 27*a*, the document 30 is not read by the reading sensor 27*a*. The front and back of the document 30 passed through the reading circuit 27 is inverted by the switchback mechanism 30A. Then, the document 30 is fed again to the reading circuit 27 side and the document 30 is read thereby. In this instance, since a surface of the first document 30 on which printing is applied is a back surface side, the reading sensor 27*a* reads the back surface side of the document 30 (step S33). Applying the image processing to the second document 30 by the image processing circuit 11*g* (step S34) allows the document 30 to print on a copier paper. The second document 30 read by the reading circuit 27 is discharged from the discharge opening 21*b* of the housing 21 to the discharge tray 21*d* side.

Thereafter, reading of the back surface side of the document 30 by the reading sensor 27*a* by inverting the front and back of a third document and succeeding documents of the document 30 by the switchback mechanism 30A (step S33), and image processing to the document 30 by the image processing circuit 11*g* (step 34) are repeated (step 35: NO), as with the second document. When the copy processing to the last page of the document based on the reading by the reading circuit 27 is completed (step S35: YES), the processing is terminated.

As mentioned above, in the present embodiment, at the time of reading of the single-sided document (document 30) in the single-side reading setting, for a first single-sided document (single-sided document 30) automatically fed by the automatic document feeder (ADF 20), the automatic document feeder control circuit (ADF control circuit 11*d*) controls to activate the switchback mechanism (switchback mechanism 30A) to read a front surface and a back surface of the single-sided document (document 30) by the reading circuit (reading circuit 27). Then, an image signal read by the reading circuit (reading circuit 27) is converted into image data by the image processing circuit (image processing circuit 11*g*), and the blank paper detecting circuit (blank paper detecting circuit 11*f*) detects whether the single-sided document (document 30) is a blank paper or not from the image data converted by the image processing circuit (image processing circuit 11*g*). Further, when a blank paper is detected by the blank paper detecting circuit (blank paper detecting circuit 11*f*) from the image data before inversion, the automatic document feeder control circuit (ADF control circuit 11*d*) controls to continue the activation of the switchback mechanism (switchback mechanism 30A) for a second document and succeeding documents of the single-sided document (document 30). Otherwise, when a blank paper is not detected from the image data before inversion by the blank paper detecting circuit (blank paper detecting circuit 11*f*), the automatic document feeder control circuit (ADF control circuit 11*d*) controls to stop the activation of the switchback mechanism (ADF control circuit 11*d*) for the second document and the succeeding documents of the single-sided document (document 30).

This eliminates the necessary for resetting the single-sided document (document 30) even if a set error of the single-sided document (30) is occurred at the time of reading of the single-sided document (document 30) in the single-side reading setting.

When in the present embodiment, a blank paper is detected from the image data before inversion by the blank paper detecting circuit (blank paper detecting circuit 11*f*), the automatic document feeder control circuit (ADF control circuit 11*d*) controls to cause the automatic document feeder (ADF 20) to discharge the document 30 into the discharge opening (first discharge opening 21*b*) after the single-sided document (document 30) is inverted again by the switchback mechanism (switchback mechanism 30A), every time the reading of the second document and the succeeding documents of the single-sided document (document 30) is completed.

Thereby, since the single-sided document (document 30) is discharged into the discharge opening (first discharge opening 21*b*), with a front surface side thereof facing downward, for example, it is possible to make the order of pages of the single-sided document (document 30) after discharge the same as the order of pages at the time of setting of the single-sided document.

The apparatus thus configured as above enables an exhibition of the effects as follows.

Since in the above-mentioned typical image processing apparatus, the blank paper detecting unit (WIU) detects whether the top page of the document is a blank paper or not, when the read top page of the document is a blank paper, information on a set error of the document is displayed on a liquid crystal touch panel in the copy processing to the document, the facsimile transmission processing, and the scanner distribution processing. In this instance, where the top page of the document is a blank paper is that a surface side on which no printing is applied is read due to a set error of the single-sided document that.

Thus, a user can become aware of the set error of the document at an early stage when the information on the set error is displayed at the stage of reading of the top page. This shortens the time and labor, especially, when the number of the document is large.

However, while a user can make aware of the set error of the document at the early stage, there still remains a problem that it needs to restart the reading process after the document is set correctly.

The present disclosure is made in view of such circumstances, and is capable of providing an image forming apparatus able to successfully solve the above-mentioned problem.

More specifically, according to the image forming apparatus of the present disclosure, when a blank paper is detected from the image data before inversion by the blank paper detecting circuit, the automatic document feeder control circuit controls to continue the activation of the switchback mechanism for a second document and succeeding documents of the single-sided document. Otherwise, when a blank paper is not detected from the image data before inversion by the blank paper detecting circuit, the automatic document feeder control circuit controls to stop the activation of the switchback mechanism for the second document and the succeeding documents of the single-sided document. Accordingly, the present disclosure eliminates the necessity for resetting the single-sided document even if a set error of the single-sided document is occurred at the time of reading of the single-sided document in the single-side reading setting.

Incidentally, when a back surface side of the document 30 is read by activating the above-mentioned switchback mechanism 30A, the orders of reading of the document 30 comes to a descending order. In such a case, the image data converted by the image processing circuit 11*g* may once be stored in the above-mentioned memory 11*h* or the like, and the image data stored in the memory 11*h* or the like maybe sorted in an ascending order at the stage when image processing to the last page of the document by the image processing circuit 11*g* is completed. This allows the document 30 to be printed on a copier paper in an ascending order of the document 30.

While in the above-mentioned each embodiment, the description is made by giving an exemplary embodiment where processing after reading of the document 30 is the copy processing, it goes without saying that the facsimile transmission processing and the scanner distribution processing may be executed, or alternatively, not necessarily limited thereto.

While in the above-mentioned each embodiment, the description is made by giving an exemplary embodiment where the image forming apparatus according to the present disclosure is applied to the MFP that is a multifunction printer, the image forming apparatus may be applied to a printer, or alternatively, not necessarily limited thereto.

What is claimed is:

1. An image forming apparatus comprising:
   an automatic document feeder that automatically feeds a single-sided document;
   an automatic document feeder control circuit that controls document feeding of the automatic document feeder;
   a reading circuit that reads the single-sided document automatically fed by the automatic document feeder;
   an image processing circuit that converts an image signal read by the reading circuit into image data; and
   a blank paper detecting circuit that detects whether the single-sided document is a blank paper or a not blank paper from the image data converted by the image processing circuit, wherein
   the automatic document feeder includes a switchback mechanism that inverts the front and back of the single-sided document to switch a surface of the single-sided document opposing the reading circuit,
   the automatic document feeder control circuit controls to activate the switchback mechanism for a first document of the single-sided document to thereby cause the reading circuit to read a front surface and a back surface of the single-sided document,
   when a blank paper is detected from the image data in the first document of the single sided document before inversion by the switchback mechanism, the automatic document feeder control circuit controls to cause to continue the activation of the switchback mechanism for a second document and succeeding documents of the single-sided document, and to cause the reading circuit to read the back surface of the single-sided document after inversion without causing the reading circuit to read the front surface of the single-sided document before inversion, and
   when the blank paper is not detected from the image data in the first document of the single-sided document before inversion by the switchback mechanism, the automatic document feeder control circuit controls to cause the automatic document feeder to stop the activation of the switchback mechanism for the second document and the succeeding documents of the single-sided document, and to cause the reading circuit to read the front surface of the single-sided document.

2. The image forming apparatus according to claim 1, wherein the reading circuit includes a reading sensor that reads the single-sided document.

3. The image forming apparatus according to claim 1, wherein
   the automatic document feeder control circuit, when the reading of the first document of the single-sided document is completed, controls to cause the automatic document feeder to discharge the single-sided document into a discharge opening after the single-sided document is inverted again by the switchback mechanism.

4. The image forming apparatus according to claim 1, wherein
   the automatic document feeder control circuit, when a blank paper is detected from the image data before inversion by the blank paper detecting circuit, controls to cause the automatic document feeder to discharge the single-sided document into a discharge opening after the single-sided document is inverted again by the switchback mechanism, every time the reading of the second document and the succeeding documents of the single-sided document is completed.

* * * * *